United States Patent
Kallfass

(10) Patent No.: US 10,207,925 B2
(45) Date of Patent: Feb. 19, 2019

(54) ZEOLITE COMPONENTS FOR USE IN SOLID CHEMICAL OXYGEN GENERATORS

(71) Applicant: Goodrich Lighting Systems GmbH, Lippstadt (DE)

(72) Inventor: Christoph Kallfass, Schwaebisch Hall (DE)

(73) Assignee: GOODRICH LIGHTING SYSTEMS GMBH, Lippstadt (DE)

(*) Notice: Subject to any disclaimer, the term of this patent is extended or adjusted under 35 U.S.C. 154(b) by 68 days.

(21) Appl. No.: 14/837,568

(22) Filed: Aug. 27, 2015

(65) Prior Publication Data

US 2016/0060111 A1    Mar. 3, 2016

(30) Foreign Application Priority Data

Aug. 27, 2014 (EP) .................................... 14182423

(51) Int. Cl.
*B01J 7/00* (2006.01)
*C01B 13/02* (2006.01)

(52) U.S. Cl.
CPC ............. *C01B 13/0218* (2013.01); *B01J 7/00* (2013.01); *C01B 13/0296* (2013.01)

(58) Field of Classification Search
None
See application file for complete search history.

(56) References Cited

U.S. PATENT DOCUMENTS

| | | | | |
|---|---|---|---|---|
| 3,604,416 A * | 9/1971 | Petrahai | ................... | A62B 7/10 128/201.25 |
| 4,410,501 A | 10/1983 | Taramasso | | |
| 4,614,186 A * | 9/1986 | John | ...................... | A62B 17/04 128/201.25 |
| 4,713,101 A * | 12/1987 | Spring | ..................... | C06D 5/00 126/263.01 |
| 5,531,807 A * | 7/1996 | McCombs | ............... | A62B 7/14 55/357 |

(Continued)

FOREIGN PATENT DOCUMENTS

| | | | |
|---|---|---|---|
| CN | 1035248 A | * | 9/1989 |
| DE | 3039442 A1 | | 5/1982 |

(Continued)

OTHER PUBLICATIONS

Il et al: "Catalytic Effect of Metal Oxides on Thermal Decomposition Reactions the Catalytic Effect of Metal Oxides on Thermal Decomposition Reactions. The Catalytic Effect of Metal Oxides on the Thermal Decomposition of Potassium Chlorate and Potassium Perchlorate as Detected by Theremal Analysis Methods", Journal of Phys. Chem, vol. 74, No. 18, Dec. 1, 1970, pp. 3317-3324, XP055163443, 8 pages.

(Continued)

*Primary Examiner* — Melissa S Swain
(74) *Attorney, Agent, or Firm* — Cantor Colburn LLP

(57) ABSTRACT

The present invention relates to a composition for generating oxygen, comprising at least one oxygen source selected from chlorates and perchlorates, to an oxygen generator comprising such a composition, and a method for generating oxygen by decomposing such a composition. The present invention further relates to the use of zeolite compounds as multifunctional components in the oxygen generating compositions.

13 Claims, 1 Drawing Sheet

(56) References Cited

U.S. PATENT DOCUMENTS

| | | | | |
|---|---|---|---|---|
| 5,599,518 | A | * | 2/1997 | Kaczur ................ C01B 11/022 423/477 |
| 6,481,747 | B1 | * | 11/2002 | Astrauskas ............. C06D 5/06 280/741 |
| 7,210,479 | B2 | * | 5/2007 | Van den Akker ..... A61M 16/00 128/204.24 |
| 8,454,525 | B2 | * | 6/2013 | Bowman ................ A61B 5/028 600/481 |
| 2006/0051255 | A1 | * | 3/2006 | Grudace ................ A62B 21/00 422/120 |
| 2007/0227541 | A1 | * | 10/2007 | Van den Akker ..... A61M 16/00 128/205.24 |
| 2012/0037368 | A1 | * | 2/2012 | Eick ...................... C09K 8/516 166/300 |

FOREIGN PATENT DOCUMENTS

| | | | |
|---|---|---|---|
| DE | 3725105 A1 | 2/1989 | |
| EP | 1049646 A1 | 11/2000 | |
| JP | 53093194 A | * 8/1978 | |
| JP | 60028826 A | * 2/1985 | ......... B01D 67/0051 |
| JP | 04362006 A | * 12/1992 | ......... C01B 13/0296 |
| WO | 9938796 A1 | 8/1999 | |
| WO | 2008094490 A1 | 8/2008 | |
| WO | 2012108764 A1 | 8/2012 | |

OTHER PUBLICATIONS

European Search Report for application No. EP14182423.5-1354; dated Feb. 4, 2015, 8 pages.

Gershonov et al: "Novel Synthetic Approach in Microwave-Assisted Solid-Supported Oxidations using 'in situ' generated molecular oxygen", Tetrahedron, Elsevier Science Publishers, Amsterdam, NL, vol. 63, No. 18, Mar. 30, 2007, pp. 3762-3767, XP022009160, ISSN: 0040-4020, DOI: 10.1016/J. TET. 2007.02.061, 6 pages.

Heinrich A. R. et al.: X-ray Rietveld Structure Determination of Cs2CuSi5O12, a Pollucite Analogue, Acta Cryst. (1991), C47, pp. 237-241; 5 pgs.

M. M. Markowitz, D. Boryta, H. Stewart: Lithium Perchlorate Oxygen Candle, I and EC Product Research and Development, vol. 3, No. 4, Dec. 1964, 321-330, 10pgs.

Moliner M.: State of the art of Lewis acid-containing zeolites: lessons from fine chemistry to new biomass transformation processes, Dalton Trans., 2014, 43, pp. 4197-4208; 12 pgs.

Patarin J. et al.: Iron distribution in iron MFI-type zeolite samples synthesized in fluoride medium: Influence of the synthesis procedure, Zeolites, 1990, pp. 674-679; 6pgs.

Patra A. K. et al.: Synthesis of Hierarchical Mesoporous Mn-MFI Zeolite Nanopar-ticles: A Unique Architecture of Heterogeneous Catalyst for the Aerobic Oxidation of Thiols to Disulfides, ChemCatchem, 2014, 6, pp. 220-229; 10pgs.

Rossin J. A. et al.: Synthesis of cobalt containing ZSM-5, Zeolites, 1987, 7, pp. 295-300; 6pgs.

W. H. Schechter, R. R. Miller, R. M. Bovard, C. B. Jackson, J. R. Pappenheimer, Chlorate Candles as a Source of Oxygen, Ind. Eng. Chem. 42, 2348 (1950). 6 pgs.

Zhang S. et al.: Effect of zinc introduction on catalytic performance of ZSM-5 in conversion of methanol to light olefins, Chemical Papers 68(9), pp. 1187-1193 (2014); 7 pgs.

Heinrich, Frank, Selektive katalytische Reduktion von Stickstoffmonoxid mit Kohlenwasserstoffen an eisenmodifizierten Zeolithen, doctoral dissertation, Ruhr-Universität Bochum, 2002, in particular chapter 2.1.2., 162 pages.

* cited by examiner

ZEOLITE COMPONENTS FOR USE IN SOLID CHEMICAL OXYGEN GENERATORS

FOREIGN PRIORITY

This application claims priority to European Patent Application No. 14 182 423.5 filed Aug. 27, 2014, the entire contents of which is incorporated herein by reference.

TECHNICAL FIELD

The present invention relates to solid compositions for generating oxygen, comprising at least one oxygen source selected from alkali metal chlorates, alkali metal perchlorates, alkaline earth metal chlorates, alkaline earth metal perchlorates and mixtures thereof, to oxygen generators comprising such compositions, to methods for generating oxygen by combusting such compositions, and to the use of zeolite compounds as multifunctional components in such compositions.

BACKGROUND

Compositions for generating oxygen are required in restricted environments such as submarines or space capsules, or in emergency situations such as in case of sudden pressure drops in aircrafts.

In principle, oxygen generating compositions are known since a long time. Typically, the compositions produce oxygen by thermal decomposition of alkali metal chlorates or perchlorates or alkaline earth metal chlorates or perchlorates. Accessory combustible materials such as carbon or metal powders (serving as fuels, i.e. reducing agents) may be added in order to assist in obtaining the high temperatures required for the decomposition of the chlorates and/or perchlorates. Since the chlorates and/or perchlorates (halogenates (+V, +VII)), in the form of candles, slowly "burn" in the presence of reducing agents, and liberate their oxygen, the compositions are also called "oxygen candles" or "chlorate candles".

Further usual constituents of solid oxygen generating compositions are binders or stabilizers, such as silicates and mica (e.g. phlogopite), for influencing the decomposition rate of the oxygen sources and assisting in maintaining structural integrity, additives for suppressing undesired side reactions or for capturing undesired side products, and catalysts such as oxides of various transition metals for speeding up reaction rates or for lowering reaction temperatures, respectively.

The compositions are molten and cast into a desired shape or, usually, press-moulded into powder compacts such as cylindrical rods, tablets, briquettes or other shapes. The shaped composition is placed into a container, and combined with a primer to yield an oxygen generator, which ideally can be easily handled and stored for a quite long time without suffering deterioration.

Once the primer (ignitor) is activated, for example mechanically or electrically, the released energy starts the halogenate decomposition reaction which proceeds without supply of auxiliary power.

Desirably, the oxygen generators shall produce an oxygen stream reliably and continuously over an extended period of time.

Further desirably, the oxygen stream shall be breathable by humans, i.e. essentially free from toxic or otherwise noxious components such as carbon monoxide, carbon dioxide, and chlorine, and shall be provided at a temperature as close to room temperature as possible.

Prior to and during the reaction, the oxygen generating composition should also be in a mechanically stable form in order to avoid any failure during activation (ignition) of the composition, and to avoid interruptions of the oxygen flow, which might result from mechanical alterations of the composition structure induced by external influences, or by modifications of the course of reaction.

A particular problem arises from the fact that in conventional oxygen generators the reaction zone in the burning candle is liquid, due to the high decomposition temperature. Irrespective of the geometrical shape of an oxygen candle, there is always a reaction zone travelling through the candle, starting at the point of ignition. The oxygen generating composition, of course, does not necessarily have the form of a candle, and in the following, the term "candle" means any mould, i.e. shaped part, for example a briquette or tablet.

Depending on the ingredients of a particular oxygen candle, which influence decomposition temperature and melting temperature of the candle, the candle may melt not only in the reaction zone, but also at some distance from the reaction zone. Thus, there is a liquid zone travelling through the candle upon decomposition.

It can be easily understood, that such liquid zone within the otherwise solid candle considerably destabilizes the candle. Mechanical shocks and even slight vibrations tend to separate the unburned portion of a candle from the burned portion, thus interrupting heat transfer, and stopping the decomposition and generation of oxygen.

Various attempts have been made to impart greater structural integrity to the burning candles and their reaction residues in order to render them less sensitive to mechanical influences, and to render them suitable also for operation under zero gravity conditions.

The method of choice used in the prior art is the addition of binders, such as mica, asbestos fibers, infusorial earth, silicious fillers, or fiberglass. The binders also help to avoid extreme volume changes of the candles due to oxygen loss, which is particularly important if an oxygen generator does not contain one single candle, but a plurality of candles in contact with each other. In such an arrangement one burning candle ignites the next candle. Shrinkage of the burnt candle at least deteriorates contact and makes proper decomposition/combustion propagation impossible.

Up to now, however, the problem of destabilization due to localized melting during decomposition, as well as the problem of destabilization as a result of oxygen loss, has not been solved in a satisfactory manner. A further disadvantage is the high temperature of the oxygen evolved.

It is an object of the present invention to provide a solution to the problems of the prior art outlined above, and in particular to provide a composition for generating oxygen, and an oxygen generator, which produce oxygen reliably and continuously, even under adverse conditions such as in vibrating environments. Preferably, the oxygen shall have a temperature as low as possible.

SUMMARY

The object is achieved by the composition for generating oxygen, the oxygen generator, the method for generating oxygen, and the use as claimed in the independent claims. Embodiments of the invention are indicated in the respective dependent claims.

The oxygen generator of the invention is an apparatus comprising the composition for generating oxygen of the invention as well as other means and devices essential or advantageous for proper functioning, and conventional per se, for example a containment, an igniting device, means for heat insulation, filter layers for retaining particulates, etc. Reference is made to DE 30 39 442 A1 and DE 37 25 105 A1 showing exemplary oxygen generators.

The oxygen generating composition of the present invention is typically provided in the form of powder compacts, such as press-moulded rods, pellets, sheets, tablets and briquettes, however, the morphological shape and structure is not limited in any particular manner. For example, the composition may be formed into tablets having different oxygen production capacities achieved by zones of different reaction velocities as described in DE 37 25 105 A1. Further, as described in this document, the tablets may be contained in the oxygen generator container in bulk form, and intimate contact between tablets may be maintained, for example, by a tension member such as a pressure spring.

The oxygen generating composition, on the one hand, contains components conventional in such compositions, namely oxygen sources, and optionally fuels, and various auxiliary agents. Oxygen sources are halogenates, i.e. chlorates, perchlorates, and mixtures of chlorates and perchlorates of alkali metals or alkaline earth metals or mixtures thereof. Preferably, the oxygen sources are chlorates and/or perchlorates of lithium, sodium, potassium, and mixtures thereof. Particularly preferred are chlorate and perchlorate of sodium. Sodium perchlorate is the most preferred oxygen source.

As fuels various metals in powder form can be advantageously used. The fuels act as reducing agents, and are oxidized to metal oxides, thus providing additional energy for supporting the decomposition. Exemplary fuels are fine powders of aluminium, iron, magnesium, manganese, silicon, and titanium, and non-metals such as boron and carbon may also be used.

Among auxiliary agents advantageously included in the oxygen generating composition, barium peroxide, and the oxide, peroxide and hydroxide of alkali metals shall be specifically mentioned. These compounds serve for binding chlorine and carbon dioxide, which are sometimes produced in trace amounts, but should not be present in breathable oxygen.

For an overview over exemplary compositions, reactions and problems associated with oxygen generators, reference is made to M. M. MARKOWITZ, D. BORYTA, H. STEWART: Lithium Perchlorate Oxygen Candle, I and EC Product Research and Development, Vol. 3, No. 4, December 1964, 321-330 and W. H. SCHECHTER, R. R. MILLER, R. M. BOVARD, C. B. JACKSON, J. R. PAPPENHEIMER, Chlorate Candles as a Source of Oxygen, Ind. Eng. Chem. 42, 2348 (1950).

On the other hand, the oxygen generating composition contains components, known per se, but not heretofore used in oxygen generating compositions. Namely, the composition of the present invention contains a zeolite or a mixture of zeolites which replace, at least in part, conventional binders and catalysts. The zeolites are multifunctional in that they serve both as binders and as catalysts. In one embodiment, the compositions do not contain any binders and/or catalysts in addition to the multifunctional components, although the presence of conventional binders, such as silicates or mica, and/or conventional catalysts, such as oxides of iron, cobalt or manganese, in addition to the multifunctional components, is not excluded.

Zeolites constitute a large family of compounds which can be classified on the basis of characteristic structural features into various groups. There exist several classification systems and criteria for distinguishing between the numerous zeolite types. However, all zeolites have many unique structural features in common allowing, for example, formation of continuous series of mixed crystals. As a consequence, the compounds belonging to the zeolite family behave similarly.

Zeolites occur naturally, and are also produced industrially on a large scale. Industrially important zeolites are produced synthetically, for example by sol-gel processing. While naturally occurring zeolites are rarely pure, synthetic zeolites are manufactured in a uniform, phase-pure state. It is also possible to synthesize zeolite structures which do not occur in nature. For the purposes of the present invention, both naturally occurring zeolites and synthetically produced zeolites are suitable, but synthetically produced zeolites are preferred.

Zeolites are microporous, crystalline aluminosilicates or alumosilicates, respectively, belonging to the tectosilicates. The zeolite framework is built of corner-linked tetrahedra. Each tetrahedron consists of four oxygen ions which surround an Al ion or an Si ion. The framework may also contain OH- and/or F-groups, which replace oxygen ions and belong to only one single tetrahedron. Likewise, some Al and/or Si ions may be replaced by different ions, for example ions of phosphorus or transition metal ions.

The structures thus formed always comprise open channels. These open channels may form a one-dimensional system of channels (i.e. the channels are not connected to each other), a two-dimensional system of channels (i.e. the channels are connected in two dimensions), or a three-dimensional system of channels (i.e. the channels are connected in three dimensions). Some zeolite types also comprise open and/or closed cages.

Since aluminum is present in the oxidation state III ($Al^{3+}$), the zeolite framework is negatively charged, and positive ions are required to compensate for the negative charge. Such ions are typically alkali metal ions or alkaline earth metal ions, for example $Na^+$, $K^+$, $Ca^{2+}$ or $Mg^{2+}$. These ions are not constituents of the zeolite framework, but are rather accommodated within cavities, i.e. hollow spaces, of the framework. Cavities include open channels and open and closed cages.

Species accommodated within channels and open cages can move, and may be exchanged by different species, while species within closed cages remain fixed within the framework.

Most members of the zeolite family are able to accommodate water molecules within their open cavities. The water-uptake is reversible, and water-uptake and release proceeds without destruction of the zeolite crystal structure. Zeolites have the empirical formula $$M^{n+}{}_{x/n}(Al_xSi_yO_2).zH_2O$$

Aluminum and silicon may replace each other within an oxygen tetrahedron (x+y=1, with x>0 and y>0), however, the ratio y/x may not become smaller than 1. M is typically an alkali metal ion or an alkaline earth metal ion present in an amount as appropriate for compensating the anionic charge of the zeolite framework resulting from the replacement of silicon by aluminum. n represents the charge of M, and is typically 1 or 2. z indicates the number of water molecules contained within the zeolite crystal. The amount of water varies among different zeolite types, and also within one and the same zeolite because water can be absorbed and desorbed reversibly. Thus, z may range from 0 to a number corresponding to up to about 40 weight % of a particular zeolite crystal. Zeolites for use in the present invention preferably contain less water, e.g. up to about 20 weight % or less, and zeolites without crystal water may be advantageously used.

Surprisingly, the zeolite compounds act as binders and facilitate the decomposition of alkali metal and alkaline earth metal chlorates and perchlorates, i.e. catalyse the decomposition of these halogenates. Thus, they can replace both conventional binders and conventional catalysts at the same time.

A part of the aluminum and/or silicon ions of the zeolite framework may be replaced by metals conventionally known to be catalytically active in oxygen candles, for example transition metal ions. Suitable metals are, in particular, iron, cobalt and manganese. Such catalytically active constituents may be included as constituents of the zeolite framework (i.e. replacing Al and/or Si) and/or trapped within cages of the zeolite framework. The presence of such fixed catalytically active constituents further enhances the catalytic activity of the zeolites for generating oxygen. Introduction of the catalytically active ions can be performed by known procedures, e.g. during preparation of the zeolite. Reference is made in this respect to Heinrich, Frank, Selektive katalytische Reduktion von Stickstoffmonoxid mit Kohlenwasserstoffen an eisenmodifizierten Zeolithen, doctoral dissertation, Ruhr-Universität Bochum, 2002, in particular chapter 2.1.2.

Alternatively, or in addition, to fixing catalytically active constituents within the framework by replacing aluminum and/or silicon or trapping the catalytically active constituents within cages, compounds conventionally known as "fuels" may be introduced into open channels and/or open cages of the zeolite framework. Suitable compounds are, for example, transition metals like e.g. Fe, Mn, Ti, Zn, Cu, Zr, Co containing compounds or carbon containing compounds. Such fuels, which are movably incorporated, can be introduced by known procedures, e.g. via ion exchange or via adsorption. They act as reducing agents, and are oxidized during the decomposition reaction, thus providing additional energy for supporting the decomposition. Zeolites having fuels releasably incorporated therein may replace, at least in part, not only binders and catalysts, but also conventional fuels, in an oxygen candle. Examples for synthesizing transition metal containing zeolites are indicated e.g. in Rossin J. A. et al.: Synthesis of cobalt containing ZSM-5, Zeolites, 1987, 7, pp 295-300;

Patarin J. et al.: Iron distribution in iron MFI-type zeolite samples synthesized in fluoride medium: Influence of the synthesis procedure, Zeolites, 1990, pp 674-679;

Heinrich A. R. et al.: X-ray Rietveld Structure Determination of $Cs_2CuSi_5O_{12}$, a Pollucite Analogue, Acta Cryst. (1991), C47, pp 237-241;

Patra A. K. et al.: Synthesis of Hierarchical Mesoporous Mn-MFI Zeolite Nanopartides: A Unique Architecture of Heterogeneous Catalyst for the Aerobic Oxidation of Thiols to Disulfides, ChemCatchem, 2014, 6, pp 220-229;

Moliner M.: State of the art of Lewis acid-containing zeolites: lessons from fine chemistry to new biomass transformation processes, Dalton Trans., 2014, 43, pp 4197-4208;

Zhang S. et al.: Effect of zinc introduction on catalytic performance of ZSM-5 in conversion of methanol to light olefins, Chemical Papers 68(9), pp 1187-1193 (2014); and Particularly preferred fuels are transition metal compounds which are oxidized into catalytically active transition metal oxides. As an example, iron hydroxide FeOH shall be mentioned. Iron hydroxide as a fuel is oxidized during the decomposition reaction into iron oxide $Fe_2O_3$, and iron oxide constitutes a catalyst for the chlorate/perchlorate decomposition reaction. Thus, catalytic activity and fuel activity can be advantageously combined.

A further advantage of zeolites in compositions for generating oxygen stems from their reversible hydration/dehydration ability. The transition from the hydrated to the dehydrated forms is an endothermic reaction. Consequently, at least some of the reaction heat released by a burning candle is used for providing the energy for the endothermic zeolite dehydration reaction. The consumed heat is no longer available for heating the oxygen liberated from the oxygen candle, and, therefore, the oxygen is provided at a lower temperature than without use of the multifunctional zeolites of the present invention. Excess water within the product gas can be captured by water absorption or filter means provided within the oxygen generator container, and conventionally known in the art.

Exemplary zeolites for use in the present invention are sodalites, mordenites, heulandites, and natrolites.

Sodalite is a zeolite without zeolitic water, and comprising cages. Sodalite has the chemical formula $Na_8[(Cl, OH)_2Al_6Si_6O_{24}]$.

Mordenite has the chemical formula $(Na_2, Ca, K_2)_4(Al_8Si_{40})O_{96}28H_2O$. Mordenite has a one-dimensional system of open channels.

Heulandite is a not specifically defined compound of a series of mixed crystals having the chemical composition $(X)_5[Al_9Si_{27}O_{72}] \approx 24H_2O$. X may be Ba, Ca, K, Na, and Sr, which may replace each other in the chemical formula. Heulandite has a two-dimensional system of open channels.

Natrolite has the chemical formula $Na_2[Al_2Si_3O_{10}]2H_2O$. It is the Na-rich end member of a series of mixed crystals, wherein Na is replaced by Ca and water. The other end members are scolecite $Ca[Al_2Si_3O_{10}]3H_2O$ and mesolite $Na_2Ca_2[Al_6Si_9O_{30}]8H_2O$. Natrolite has a three-dimensional system of open channels.

It is stressed that the zeolites mentioned above are merely disclosed by way of example, but other zeolite types are suitable as well. Namely, although the family of zeolites is large, all zeolites behave substantially similar. It is believed that the similar behaviour of all compounds belonging to the zeolite family is due to the numerous structural similarities of these compounds (allowing, for example, the formation of continuous series of mixed crystals), in particular the framework structure having open cavities, resulting in similar properties and effects.

The multifunctional zeolite compounds used according to the present invention provide distinct advantages when incorporated into oxygen generating compositions. In the presence of the multifunctional compounds, the process of decomposition proceeds without formation of a liquid phase. That is, while a reaction zone travels through a "burning" candle, no liquid zone travels through the candle. Any localized melting of the composition cannot be observed.

The lack of any liquid phase formation provides enhanced mechanical stability and improved chemical reaction control as compared to prior art oxygen candles. Candles, or other shaped parts, according to the present invention are less susceptible to external influences, for example shocks, or shaking or tilting an oxygen generator during use. Separation of used portions from unused portions of a candle at their liquid interfaces is avoided due to a lack of such liquid interfaces, thus avoiding interruption of decomposition/combustion, and reliably providing a continuous and enduring oxygen flow.

The candles, or other shaped parts, substantially maintain their sizes and shapes during use, although they release considerable amounts of their chemically bound oxygen, due to oxygen liberation in gaseous form. Therefore, while in prior art candles the morphological structure breaks down during use of a candle, i.e. the reaction residues have a remarkable smaller volume than the starting compositions, in candles according to the present invention the structure remains substantially intact. What can be observed is an increase of porosity: While a pristine candle may have no visible pores or only a few pores and/or small pores, a used candle is porous or, at least, has more pores and larger pores than a pristine candle.

The structural stability also reduces contact problems in oxygen generator embodiments using a series of candles, or candles (tablets, pellets) in bulk form. Once the reaction zone has completely traveled through a candle within a plurality of candles, the heat of reaction evolved by the first candle can be used for activating, i.e. igniting, a neighbouring candle or neighbouring candles. Consequently, reaction reliably jumps from one candle across an adjacent one, thus also contributing to continuous and enduring oxygen evolution.

The reaction starts at lower reaction temperatures than without catalyst, and produces less reaction heat than with prior art catalysts. As a result, the oxygen liberated from the compositions of the present invention is at a somewhat lower temperature, and thus more suitable for physiological use.

BRIEF DESCRIPTION OF DRAWINGS

The advantages of the inventive use of multifunctional components in oxygen generating compositions are further illustrated by the following figures, wherein.

DETAILED DESCRIPTION OF THE INVENTION

Figure 1:
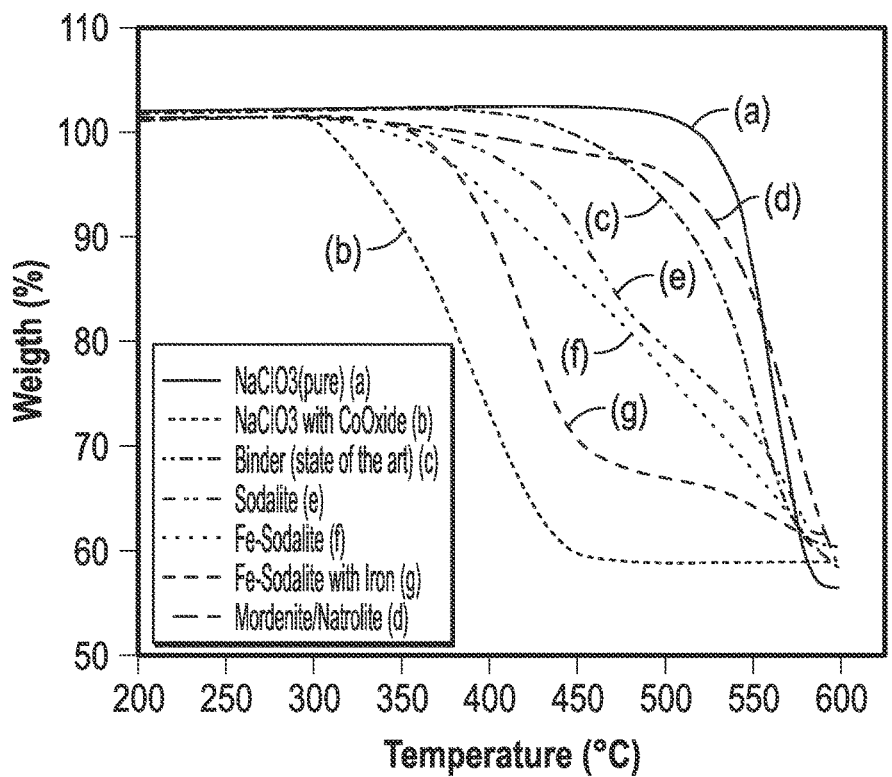
FIG. 1 shows graphs illustrating the weight loss of preparations containing sodium chlorate and various additives upon thermolysis.

Referring to FIG. 1, different preparations in powder form containing sodium chlorate and various additives (weight ratio of sodium chlorate:additives=97:3) were heated in air with a heating rate of 10 K/min in the temperature range from room temperature to 600° C. in a thermolysis device. Sample weights were about 130 mg, and the samples were contained in an alumina crucible.

Curve (a) illustrates the decomposition of pure sodium chlorate (i.e. without any additives).

Curve (b) illustrates the decomposition of a composition comprising sodium chlorate and cobalt oxide CoO. For catalyzing the decomposition of sodium chlorate, cobalt oxide constitutes the catalyst known to work best. Cobalt oxide does not act as a binder.

Curve (c) illustrates the decomposition of a composition comprising sodium chlorate and phlogopite. Phlogopite acts as a binder and has the chemical formula $K\,Mg_3[(F,OH)_2AlSi_3O_{10}]$, i.e. it is an aluminosilicate. Phlogopite has been used in oxygen candles already for decades by some manufacturers, and is still used by some manufacturers of oxygen candles (e.g. by Draeger, Lubeck). Phlogopite has been chosen as a reference due to its similarity to zeolites as regards its chemical composition. It has a framework formed from oxygen, aluminum and silicon, and fluoride and hydroxyle groups may be also contained within the framework. Alkalimetal ions and alkaline earth metal ions compensate for the negative charge of the framework. There is, however, a decisive difference between zeolites and phlogopite as regards structural features. While zeolites are tectosilicates, phlogopite belongs to the phyllosilicates. The oxygen ions in phlogopite are arranged in tetrahedra and octahedra and, in particular, phlogopite does not comprise open cavities such as channels and cages.

Curve (d) illustrates the decomposition of compositions comprising sodium chlorate and mordenite, and sodium chlorate and natrolite, respectively. Both compositions behave identical, i.e. produce identical curves.

Curves (e), (f), and (g) illustrate the decomposition of compositions comprising sodium chlorate and different sodalites. The sodalite of curve (e) did not contain iron, the sodalite of curve (f) had iron incorporated within the framework, i.e. as a replacement of aluminum and/or silicon. The sodalite of curve (g) had iron fixed within the framework (identical to the sodalite of curve (f)) and, in addition, contained iron within open channels of the sodalite framework, i.e. releasably incorporated.

Examination of the weight loss upon heating yielded the following results:

The decomposition of pure sodium chlorate (i.e. without catalyst, without binder; curve (a)) starts at about 480° C., progresses quickly with increasing temperature, and is completed at about 592° C. 50 weight % of the sodium chlorate have been decomposed at about 560° C.

The decomposition of the composition comprising sodium chlorate and cobalt oxide CoO (i.e. with catalyst, without binder; curve (b)) starts at about 300° C., progresses quite quickly and in a constant manner with increasing temperature, and is completed at about 500° C. 50 weight % of the sodium chlorate have been decomposed at about 386° C.

The decomposition of the composition comprising sodium chlorate and phlogopite (i.e. with a binder, without a catalyst; curve (c)) starts at about 370° C., is slow at the beginning, but accelerates with increasing temperature, and is completed at about 580° C. 50 weight % of the sodium chlorate have been decomposed at about 542° C.

The decomposition of the composition comprising sodium chlorate and mordenite or natrolite (i.e. containing a multifunctional component of the present invention; curve (d)) starts at about 300° C., proceeds slowly and with a constant rate until about 500° C., and proceeds quickly and with a constant rate at temperatures exceeding 500° C. until completion of the decomposition at about 600° C. 50 weight % of the sodium chlorate have been decomposed at about 559° C.

The decomposition of the composition comprising sodium chlorate and sodalite (i.e. containing a multifunctional component of the present invention; curve (e)) starts at about 300° C., proceeds with an increasing rate until about 470° C. and becomes somewhat slower at temperatures exceeding 470° C., until the decomposition is complete at about 600° C. 50 weight % of the sodium chlorate have been decomposed at about 500° C.

The decomposition of the composition comprising sodium chlorate and sodalite having iron within the framework (i.e. containing a multifunctional component of the present invention; curve (f)) starts at about 300° C., proceeds similar to the decomposition in the presence of unmodified sodalite (curve (e)), and is completed at about 600° C. 50 weight % of the sodium chlorate have been decomposed at about 489° C. It can be seen that the decomposition in the presence of iron-modified sodalite is shifted to somewhat lower temperatures as compared to unmodified sodalite.

The decomposition of the composition comprising sodium chlorate and sodalite having iron within the framework and within open cavities (i.e. containing a multifunctional component of the present invention; curve (g)) starts at about 300° C., proceeds quickly in the temperature range from about 350° C. to 450° C., and then slows down until the decomposition is completed at about 582° C. 50 weight % of the sodium chlorate have been decomposed at about 424° C., and 75 weight % of the sodium chlorate have been decomposed at about 450° C.

The results prove that the multifunctional components of the present invention shift the onset of the chlorate decomposition to lower temperatures, in comparison to pure sodium chlorate, and also in comparison to compositions comprising sodium chlorate and a binder similar in composition, but somewhat different in structure, from the multifunctional components of the present invention. With the multifunctional components of the present invention, chlorate decomposition starts at about 300° C., i.e. comparable to compositions containing the best known chlorate decomposition catalyst, CoO. At low temperatures the chlorate decomposition is slow (curves (d) and (e)), however, the results can be improved by modifying the multifunctional zeolites with agents known to have catalytic activity and/or known to act as fuels (see curves (f) and (g)). In addition, all zeolite containing compositions (curves (d) to (g)) perfectly maintain their shapes during chlorate decomposition, in contrast to the compositions of curves (a) to (c), as explained below.

Oxygen candles were prepared from all preparations described above with reference to FIG. 1. For preparing candles having a weight of 30 g and 60 g, respectively, and a diameter of 40 mm, the constituents were milled, blended in a mixer, and then press-moulded into cylinders by applying a force from 40 to 400 kN involving post-compaction for a period between 1 to 5 minutes. In all cases, the obtained powder compacts were mechanically stable. They could be handled easily, and appeared to be poreless when observed with the naked eye. The moulding pressure influenced the burning speed: Decomposition rate decreased with increasing moulding pressure, i.e. powder compacts moulded with a pressure of 40 kN burned faster than powder compacts moulded with a pressure of 400 kN. A moulding pressure in the range from 100 to 400 kN yielded powder compacts having a density of about 2.5 g/cm$^3$, which appeared most suitable.

The oxygen candles were ignited by means of a conventional primer tablet. The primer tablet provided the reaction heat for starting the decomposition reaction of the sodium chlorate, yielding sodium chloride and oxygen.

Oxygen evolution started in all cases within less than 10 seconds after ignition of the primer tablet. The candles having a weight of about 30 g evolved oxygen for somewhat more than 3 minutes, and the candles having a weight of about 60 g evolved oxygen for more than 7 minutes.

Examination of the used candles revealed that the candles consisting of pure sodium chlorate, of sodium chlorate in combination with cobalt oxide, and of sodium chlorate in combination with phlogopite, respectively, had deformed considerably due to melting. In contrast, all chlorate candles comprising a multifunctional component according to the present invention had maintained their cylindrical shapes perfectly. The used oxygen candles had a clearly visible pore structure, and the density decreased to about 2.1 g/cm$^3$, however, the cylinders were still mechanically stable and could be handled easily. It is evident that no liquid phase formed during the decomposition reaction in the presence of zeolites, and no destabilization of the candles occurred.

Figure 2:
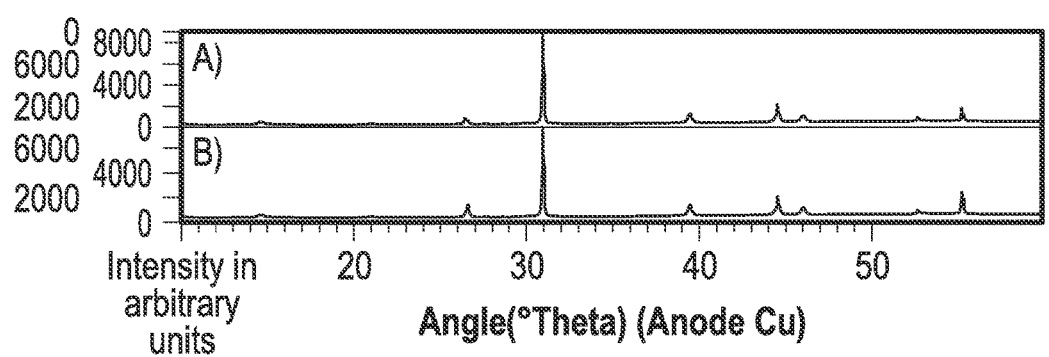
FIG. 2 shows powder diffraction patterns of a composition containing natrolite and sodium chlorate after heating to 600° C.

Referring now to FIG. 2, powder diffraction patterns of a composition comprising sodium chlorate and natrolite, measured in situ at 600° C. using a high temperature camera, are shown. The patterns were recorded in air using Cu—Kα rays and a Ni-filter. Powder diffraction pattern A was recorded after the sample had been maintained at 600° C. for one hour, and power diffraction pattern B was recorded after the sample had been maintained at 600° C. for five hours.

In both cases A and B the diffraction patterns show the reflexes of the decomposition product sodium chloride and the typical reflexes of natrolite, which were not influenced by the decomposition process.

Similar results were observed for sodalite, heulandite and mordenite, proving that the zeolites do not suffer any changes when exposed to thermal stresses during the thermal decomposition of sodium chlorate within an oxygen candle. There is no reaction between zeolites and chlorates or perchlorates, respectively, and there is also no melting of the zeolite containing compositions during the decomposition reaction.

This finding is used in the present invention for providing oxygen generators superior in resistivity against mechanical influences, and superior in reliability and endurance of oxygen formation. Even under adverse conditions such as vibrating environments or zero gravity oxygen is provided promptly and continuously.

The invention claimed is:

1. A composition for generating oxygen, comprising at least one oxygen source selected from alkali metal chlorates, alkali metal perchlorates, alkaline earth metal chlorates, alkaline earth metal perchlorates and mixtures thereof,
    composition further comprises at least one zeolite compound, the zeolite compound having a framework comprising open channels, and also comprising open cages or closed cages;
    wherein the composition is suitable for use in an oxygen candle and is free from cobalt oxide and manganese oxide and wherein the composition is configured for generating oxygen by a self-sustaining decomposition.

2. The composition of claim 1, characterized in that the at least one zeolite compound is selected from the group consisting of zeolites having a one-dimensional system of channels, zeolites having a two-dimensional system of channels, zeolites having a three-dimensional system of channels, and zeolites having cages.

3. The composition of claim 1, characterized in that the at least one zeolite compound is selected from the mordenite group, the heulandite group, the natrolite group or the sodalite group.

4. The composition of claim 1, characterized in that the at least one zeolite compound comprises at least one transition metal as a constituent of the framework and/or enclosed within a closed cage.

5. The composition of claim 1, characterized in that the at least one zeolite compound comprises at least one transition metal containing compound or carbon containing compound accommodated within an open channel and/or within an open cage.

6. The composition of claim 4, characterized in that the transition metal is selected from the group consisting of iron, manganese, cobalt, zirconium, zinc, copper and titanium.

7. The composition of claim 1, characterized by further comprising at least one fuel.

8. The composition of claim 1, characterized by further comprising at least one auxiliary agent suitable for suppressing undesired side reactions or for capturing undesired side products.

9. An oxygen generator comprising a composition for generating oxygen by a self-sustaining decomposition, a container for containing the oxygen generating composition, and a primer for starting decomposition of the oxygen generating composition, wherein the oxygen generating composition comprises at least one oxygen source selected from alkali metal chlorates, alkali metal perchlorates, alkaline earth metal chlorates, alkaline earth metal perchlorates and mixtures thereof, wherein the composition further comprises at least one zeolite compound, the zeolite compound having a frame work comprising open channels, and also comprising open cages or closed cages, the composition being suitable for use in an oxygen candle and being free from cobalt oxide and manganese oxide.

10. The oxygen generator of claim 9, characterized in that the composition is in the form of one or more shaped parts.

11. The oxygen generator of claim 9, characterized in that the composition is in the form of a single oxygen candle, a plurality of oxygen candles arranged in series, or a tableted fill in bulk form.

12. A method for generating oxygen with the oxygen generator of claim 9, comprising activating the primer to decompose the oxygen source, characterized in that melting or localized melting of the composition during decomposition is avoided by inclusion of at least one zeolite compound having a framework comprising open channels, and also comprising open cages or closed cages.

13. The method of claim 12, characterized in that the inclusion of the zeolite compound further results in reducing the temperature of the oxygen generated in the oxygen source decomposition process.

\* \* \* \* \*